Dec. 18, 1956
F. C. BERTRAM
2,774,391
DEVICE FOR FORMING WIRE HANDLES
Filed March 19, 1952
2 Sheets-Sheet 2
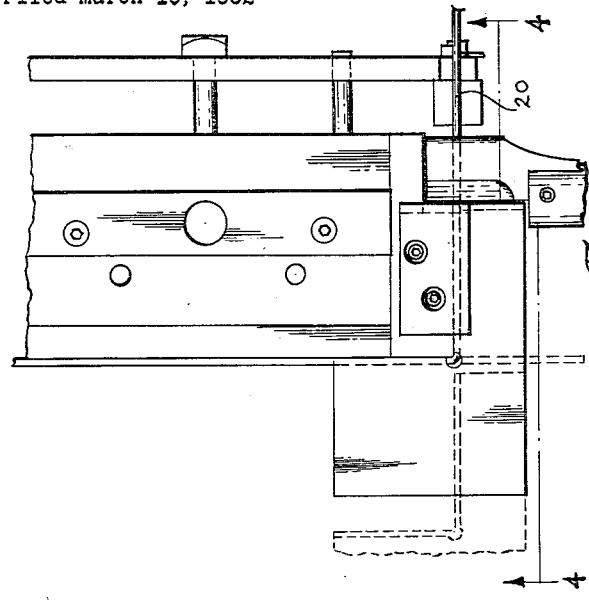
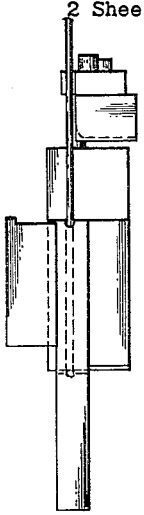
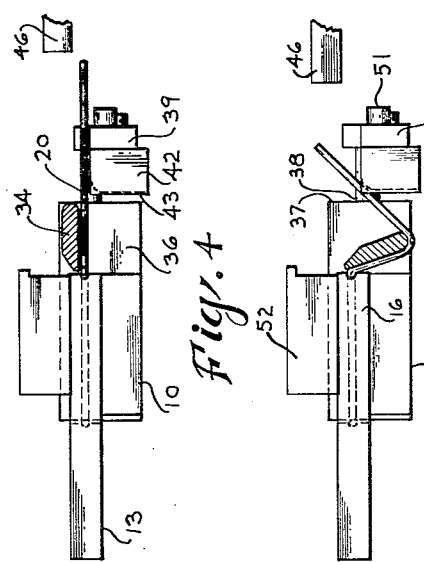
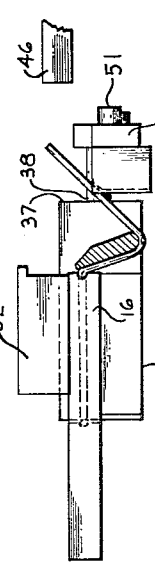
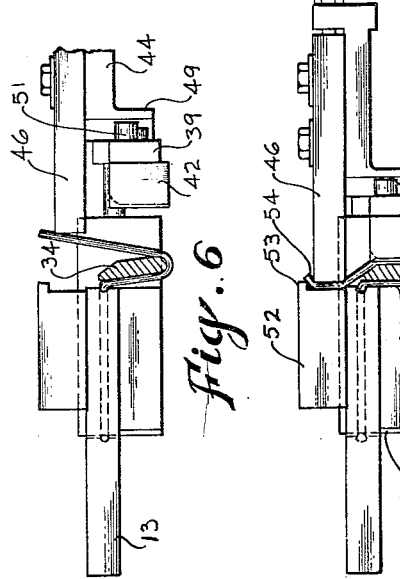
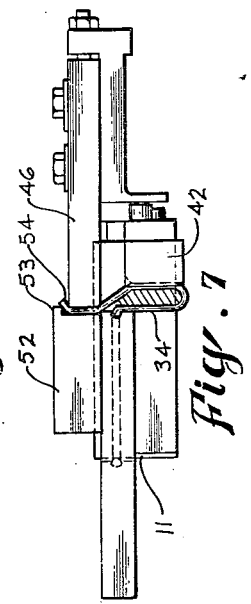
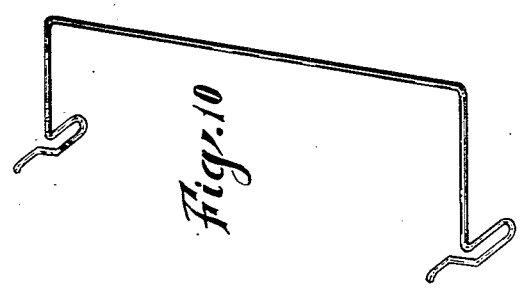
INVENTOR.
F. C. Bertram
BY
Richmond A. Hayes
ATTORNEY

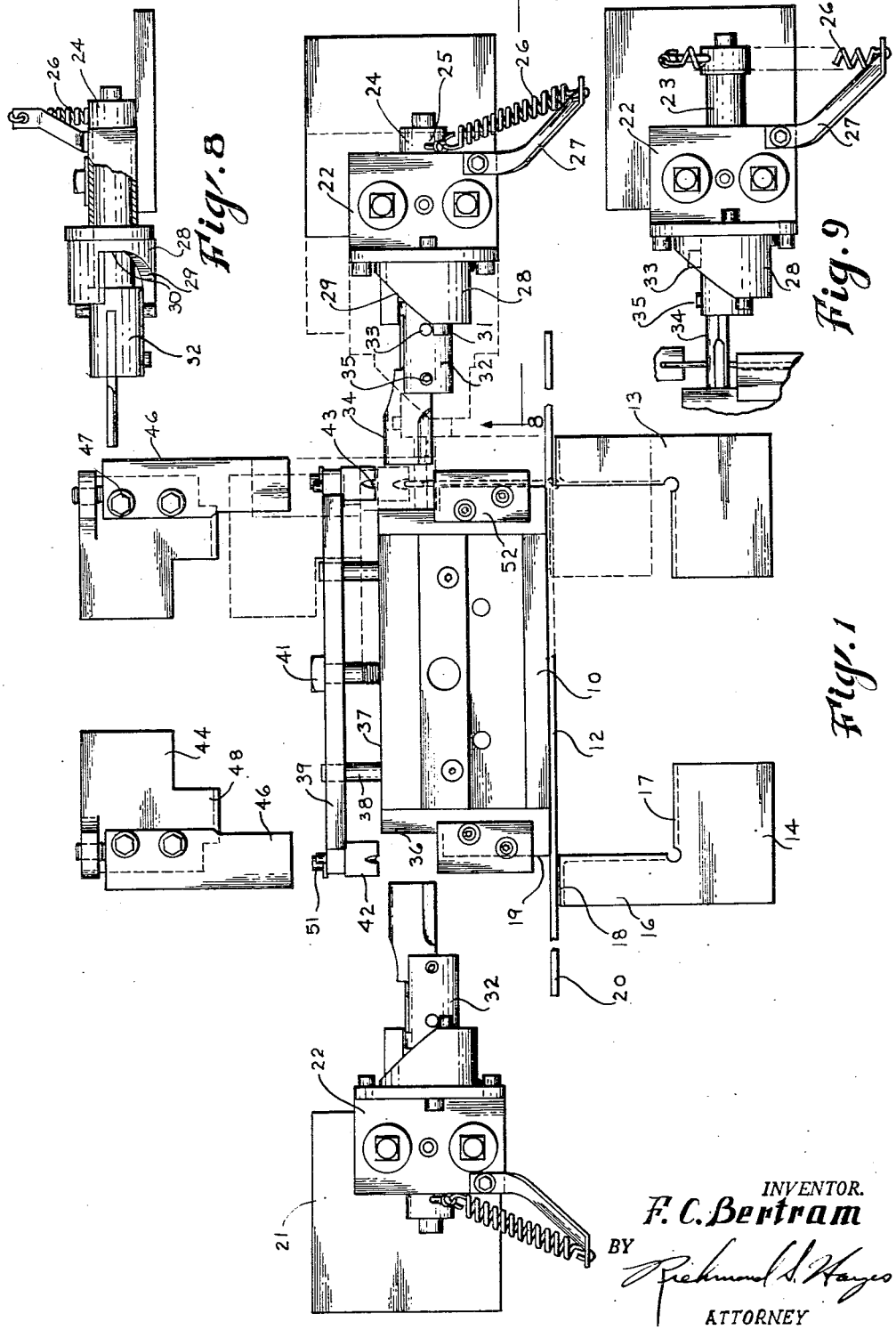

United States Patent Office 2,774,391
Patented Dec. 18, 1956

2,774,391

DEVICE FOR FORMING WIRE HANDLES

Francis C. Bertram, Mayville, N. Y., assignor, by mesne assignments, to Reif-Rexoil, Inc., Buffalo, N. Y., a corporation of New York Application March 19, 1952, Serial No. 277,498

7 Claims. (Cl. 140—75)

This invention relates to means for forming wire handles suitable for use with fruit and vegetable baskets. More particularly the invention is directed to a mechanism by which a wire rod is progressively shaped to produce a handle having a multiplicity of angular bends.

Wire handles, for use with baskets formed from veneer splint or paper board, have only relatively recently come into commercial demand, for the reason that such handles generally required a series of successive forming steps or operations and were, therefore, too costly to apply to a basket as against the lesser cost of some form of splint handle. The bending operations or steps for forming wire handles required the use of costly mutiple dies that did not readily lend themselves to high speed operation without frequent interruption for maintenance. Wire handles, to constitute an advantage over splint handles, had to be so formed that they could be easily and quickly mounted without special tools and at any convenient place of use. The F. C. Bertram Patent #2,122,082 discloses a mechanism for forming wire handles which enabled sufficiently rapid manufacture as to greatly reduce the cost of such handles and render them commercially competitive with the previously permanently attached splint handles. This patent discloses the feasibility of the rapid manufacture of wire handles when the bends in such handles are in a common plane. However, handles formed in the manner set out in this patent required an additional hand bending operation to anchor them to the baskets and, in some instances, the handle did not entirely serve its purpose because of improper assembly with the basket.

The present invention has for an object the provision of a forming die that will produce a wire handle having terminals so bent or shaped as to be readily engageable or disengageable with the sides of a basket without the aid of tools and, when engaged with the basket, is non-swinging and substantially rigid with respect thereto.

Another object of the invention lies in the provision of a forming die having relatively movable parts that successively act on successive portions of a wire rod to form a handle that includes compound bends at its terminals that are suitable for anchoring the handle to the sides of a basket.

A further object of the invention lies in the provision of a forming die in which the movable parts, functioning in a common plane, produce, by their successive operations, a handle with multiple related bends.

Another and further object of the invention lies in the provision of a forming die having successively operating parts that act on previously formed parts of a wire rod for the purpose of obtaining compound bends at the terminal ends of the rods that may serve as anchors to be interengaged with the side walls of the basket.

Other and further objects of the invention will be more fully understood from a consideration of the following specification, taken in conjunction with the accompanying drawings, in which Fig. 1 is a plan view of the assembly die, with all slidable units shown in withdrawn, inoperative position in full line, and one of each duplicated unit in operative position in dotted lines;

Fig. 2 is a slightly enlarged fragmentary plan view showing the position of certain movable parts, following the first bending operation, dotted lines suggesting the extent of movement of such parts;

Fig. 3 is a side elevational view of the structure shown in Fig. 2;

Fig. 4 is a view similar to Fig. 3, showing certain of the operative parts in position preparatory to the second bending operation, being taken substantially as suggested by the line 4—4 of Fig. 2;

Fig. 5 is a view similar to Fig. 4, showing the position of the movable parts following the second bending operation;

Fig. 6 is a view similar to Fig. 4, showing the position of the movable parts following the third bending operation;

Fig. 7 is a view similar to Fig. 4, showing the position of the movable parts following the fourth and final bending operation;

Fig. 8 is a side elevational view of one of the slidable units, shown at the right in Fig. 1, and is taken substantially as suggested by the line 8—8 of that figure;

Fig. 9 is a fragmentary plan view of one of the slidable units following the second bending operation (see Fig. 5); and Fig. 10 is a perspective view of a wire handle formed in accordance with the invention.

It is not considered necessary to illustrate a machine in which the present die is operable, inasmuch as any suitable machine for holding and guiding the various parts of the die, and for causing the required sequential movements thereof, may be used.

For the purpose of a clearer understanding of the invention, the operation thereof will be broken down into a series of successive steps. It will be understood, however, that the successive functioning of the various movable parts or units of the die are so quick that the entire operation of forming a handle appears substantially as a single rather than a multiple operation, and that this is due to the fact that the movable parts of the die can and do operate with such rapidity as to produce upwards of a handle per second of operation.

Referring more particularly to the drawings, the reference numeral 10 is employed to generally designate a central, fixed block. One vertical edge of this block provides a forming face 11 and is of a length that determines the length of the bail portion of a handle to be formed from a given length of wire rod 12. As shown in Fig. 1, a pair of movable, duplicate, reverse die members 13 are provided. These members consist of base portions 14 and legs 16. The inner edge of the base and leg are formed with lengthwise, semi-circular grooves 17 which are adapted to engage the rod 12. The free ends of the legs 16 are also formed with semi-circular grooves 18. The space between the adjacent sides of legs 16 is sufficient to receive the block 10 as defined by the end faces 19 and the ends of the rod. Prior to the first forming step, a length of rod is moved into the position shown in Fig. 1. The meeting edges of the faces 11 and 19 are rounded and, upon initial movement of the dies 13, the rod is bent around these rounded ends by the legs 16. The ends of the rod, as the dies continue to move, are bent at right angles to the body of the rod and move into contact with the faces 19 as the dies 13 come into close proximity with the block 10. Any tendency of the central portion of the rod to bow away from the face 11 of the block is counteracted by engagement of the inner edges of portions 14 with the rod to hold it as the rod ends are forced into abutment with the faces 19. The dies 13, due to their grooved edges, now hold the rod firmly in place against the block 10 and remain in this position throughout the remainder of the entire bending operation. The end portions 20 of the rod, now extending beyond the ends of faces 19, are next subjected to a bending operation through the use of further operative parts.

Adjacent opposite ends of the block 10 are located units that include die supports 21 which, through the use of suitable mechanism, not shown, are movable simultaneously and to a common extent toward and away from the ends of the block 10. The forming dies carried by these supports, although in reversed arrangement, are identical, both as to structure and operation and, therefore, only one of them will be described in detail. A housing 22 on the support 21 mounts a shaft 23, the ends of which extend beyond the housing. Fixed to one end of this shaft is a collar 24 which, by means of a pin 25, is joined to one end of a spring 26. The other end of this spring is supported on one end of a bracket 27, carried by the housing 22. The spring serves to yieldingly hold the shaft in one position of possible rotation. The shaft extends through a sleeve 28 located at the other end of the housing. This sleeve is formed with diametrically opposite cam surfaces 29 that end inwardly of the length of the sleeve in shoulders 30. A stop lug 31 extends from the end of this sleeve substantially as shown. As indicated in Fig. 8, shaft 23 has a larger diametered end 32 that has a slidable fit with the sleeve 28. A pin 33, extending radially through the sleeve, engages lug 31 when the shaft 23 occupies the position shown in Figs. 1 and 8. The end of the shaft may be slotted to receive one end of a forming die 34. This die is located and secured by pin 33 and a locking screw 35. The ends of the block 10 are stepped and, beyond the faces 19, have inwardly offset faces 36. The die extends toward the plane of the end face 19. For the particular type of handle being formed, the die has a cross section substantially as shown in Figs. 4 to 7, inclusive.

Immediately upon completion of the initial bending step set out above, supports 21 are moved inwardly toward the block 10 to the extent suggested by the dotted lines in the right end of Fig. 1 and in Fig. 9. During this movement of the supports, the ends of the forming dies 34 move into contact with the faces 36 of the block. It is to be noted that these dies, when at rest, are in a horizontal plane and that the under surfaces thereof are slightly above the plane of the rod ends 20. Thus, when the dies 34 move into contact with the faces 36, they are directly over the rod ends 20 (see Fig. 4). The distance of travel from the end of the die 34 to the face 36 is less than the full distance of travel of the support 21. Consequently, as this support continues its inward movement, the ends of pin 33 move down the cam surfaces 29 and in so doing rotate shaft 23 and die 34, carried thereby. Since one edge of the die is substantially on center with the shaft 23, said die is thus rotated about its tapered edge, compare Figs. 4 and 5. In this manner the rod end 20 is bent downwardly from the end 18 of the leg and, due to contact of the rod end with a further portion of the die, hereinafter described, a partial wrap around of the lowermost edge of the die takes place. The dies 34, it will be understood, have been rotated less than ninety degrees but are subject to further rotation by other movable parts of the device.

The rearward edge 37 of the block 10 supports a pair of guide pins 38 which project through and serve to define a path of travel for a slidable bar 39. This bar may be moved into contact with the edge 37 and may be separated from this edge only to an extent determined by the stop screw 41. Normally, the bar is yieldingly held in the position of Fig. 1 by suitable springs (not shown). Attached to the inner face of the bar, adjacent its ends, are forming blocks 42. Each of these blocks is provided with a semicircular groove 43 which faces the base block 10, the grooves continuing into and tapering off in the top surfaces of the blocks, substantially as shown in Fig. 1. During the bending step shown completed in Fig. 5, the remainder of the end portion 20 of the rod is seated in the upper portion of the groove 43.

A further set of dies, intended to act on the extremities of portions 20, are located beyond the bar 39 and consist of identical plates 44, on which dies 46 are mounted, in any suitable manner, as by screws 47. Plates 44 are movable through suitably timed operating mechanism toward and away from the edge 37 of the block 10. Dies 46 extend in a common direction beyond these plates with their under faces in substantially the same horizontal plane as the upper faces of the legs 16 of dies 13. The inner ends 48 of plates 44 are formed with depending flanges 49 which are in the horizontal plane of the bar 39. The extent to which the ends of the dies 46 project beyond the flanges 49 of plates 44 is critical to the complete forming operation. The distance of travel of the dies 46 may be increased, if required, by the operating mechanism therefor, but cannot be decreased beyond that shown inasmuch as the extreme end of the portion 20 of the rod must clear the die end 46, during the bending step, from the position of Fig. 4 to that of Fig. 5.

In order that the various steps of forming operation may successively occur as to appear as a single, almost instantaneous operation, it is necessary that certain of the parts functioning in a given step commence movement prior to the completion of a previous bending step. Thus, while the step of bending the end portions 20 is taking place, as shown in a comparison of Figs. 4 and 5, dies 46 move toward the block 10. This movement is so timed that the ends of the rod swing and move ahead of the ends of these dies. Continued movement of these dies toward the block causes their ends to contact the tip ends of the rods, thus bending the rod extremities into the form shown in Fig. 6. It will be noted that this bending step causes the rod to be somewhat wrapped around the rounded edge of the die 34. At this point it will be noted that flanges 49 of the plates 44 are in contact with the ends 51 of the pins or screws that join blocks 42 to bar 39. As the dies 46 move further in this direction, flanges 49 move bar 39 toward the edge 37 of block 10. This movement of the bar 39 causes blocks 42 to also contact the end portions 20 and, as the dies 46 complete their movement, the portions 20 are bent into the position shown in Fig. 7. Herein it will be noted that blocks 42 have rotated dies 34 to a perpendicular position, causing the rods to wrap completely around dies 34. The complete wrap around of the portions 20 of these dies is effected by dies 46 which force the tip ends of the rods against fixed blocks 52 that are mounted on the upper face of the base block 10. The slightly overhanging portions 53 of blocks 52, located above the plane of travel of dies 46, enable producing slightly return bent ends 54 at each end of the rod.

Upon the completion of this final bending step, supports 21 are immediately withdrawn to the full line position shown in Fig. 1. This movement first withdraws dies 34 from within the closed bends of the end portions 20 of the rod, whereat they instantly revert to the horizontal position shown in Fig. 4, under urgency of springs 26. Full withdrawal of the supports returns these dies to the position shown in Figs. 1 and 8. Of course, dies 13 and 46 are also instantly withdrawn from the block 10 into the position shown in Fig. 1. As dies 46 withdraw, bar 39 also moves into its most remote position with respect to the block 10. Any simple means may now be employed to quickly disengage the formed handle from its partial wrap-around of the base block 10 and, during this removal, another length of rod 12 is moved into the position shown in Fig. 1.

From the foregoing it will be evident that a given length of wire rod may be both angular and return bent to form a handle having a bight and T-like extremities for anchoring to the sides of a basket. It will be also clear that despite the multiplicity of bends and their angular relationship, the forming dies are only required to move toward or away from the base block 10 in a single plane. Certain of the right angle bending and the return bending of the rod ends is accomplished entirely by movement of the supports 21 that carry the swingable dies 34. By reason of the single plane of movement of all the forming dies, it is possible to cause them to operate with such split-second succession that a machine embodying the structure of the invention may form the handles shown in Fig. 8 of the drawing at nearly the rate of one per second.

It will of course be understood, and particularly from examination of Fig. 1 of the drawing, that handles of different proportions may be made through use of the invention, for example, through the use of a longer base block 10, the greater spacing of dies 13 and 46, and through the use of differently contoured dies 34. Any such modifications in the dies, necessary to the producing of handles other than the one shown, are considered as being within the spirit and scope of the invention insofar as such modifications may be set out in the annexed claims.

Having thus set forth my invention, what I claim as new and for which I desire protection by Letters Patent is:

1. A device for producing a multiple bend wire handle from a length of wire rod comprising, a block, die means movable toward one end of said block to bend the ends of a length of wire rod therearound and form the hand grip and leg portions of a handle, forming dies, means mounting said forming dies for movement toward said block on one side of said leg portions, means for them rotating said forming dies to partially bend said leg portions, and slidable dies mounted for movement toward said forming dies and into engagement with such leg portions to complete bending thereof by moving said leg portions relative to said forming dies in a manner and to an extent further rotating said forming dies.

2. A device for producing a multiple bend wire handle from a length of wire rod comprising, a fixed block, upstanding dies on opposite sides of said block, die means mounted for movement toward one end of said block to engage and bend the ends of a length of rod therearound to form the hand grip and leg portions of a handle, forming dies, means operable to move said forming dies toward the sides of said block to overlie said leg portions and then to rotate them about a predetermined axis to partially bend said leg portions, and slidable dies mounted for movement toward said upstanding dies to engage and complete the bending of said leg portions by moving the same around said forming dies and into contact with said upstanding dies in a manner causing further rotation of said forming dies.

3. In a device for producing a multiple bend wire handle from a length of wire rod, a fixed block about which a length of wire rod is initially bent to form the hand grip and leg portions of a handle, forming dies, means for moving said forming dies toward said block to overlie said leg portions, means for then rotating said forming dies about an axis common to their plane of movement to engage and partially form return bends in said leg portions, means including slidable dies movable toward said forming dies and having operable parts successively engaging said leg portions to further rotate said forming dies and cause said leg portions to wrap completely around said forming dies with the extremities of said leg portions abutting said block, and further means for bodily withdrawing said forming dies from the completely formed leg portions.

4. A die for producing a multiple bend wire handle from a length of wire rod comprising, a fixed block, multiple die parts mounted for movement substantially in a common plane toward said block to engage and bend a length of rod thereon, means for rotating one of said parts about an axis lying substantially in said plane to engage a portion of such rod and partially form a return bent anchoring terminal therein, another of said parts cooperating with said one part to complete the forming of said terminal, and means for withdrawing said one part when said terminal is completely formed.

5. In a device for forming a multiple bend wire handle from a length of wire rod, a block, first die means mounted for movement toward one end of said block to bend a length of rod therearound and thereby form a hand grip portion and a side leg portion, second die means mounted for movement toward a side of said block into a position on one side of such side leg portion, third die means positioned on the opposite side of such side leg portion, said third die means being mounted for movement toward said first die means, means for rotating said second die means out of said position toward said third die means to bend such side leg portion thereagainst and thereby partially form an anchoring part in such side leg portion, fourth die means mounted for movement toward said second die means into engagement with such partially bent side leg portion to further bend the same around said second die means in a manner further rotating the latter to further form said anchoring part, and means for subsequently moving said third die means with said fourth die means to still further bend such bent side leg portion around said second die means in a manner still further rotating the latter and completing the forming of said anchoring part.

6. In a device for forming a multiple bend wire handle from a length of wire rod, a block, first die means mounted for movement toward said block to bend a length of rod thereagainst and thereby form a hand grip portion and a side leg portion, second die means, support means movable toward said block, means mounting said second die means on said support means for movement relative thereto along a predetermined axis, means causing said second die means to rotate about said axis upon such relative movement, means resiliently holding said second die means and said support means against such relative movement for movement of said second die means by said support means into engagement with said block on one side of such side leg portion, said support means being movable relative to said second die means following engagement of the latter with said block to cause said second die means to rotate and partially bend such side leg portion, and further die means mounted for movement toward said second die means to engage such partially bent side leg portion and further bend the same.

7. In a device for forming a multiple bend wire handle from a length of wire rod, a block, first die means arranged for movement toward one end of said block to bend a length of rod therearound and thereby form a hand grip portion and a side leg portion and to hold such bent rod against said block during subsequent forming operations thereon, said block having an inwardly offset side wall portion, second die means, support means movable toward the side wall of said block, means mounting said second die means on said support means for movement therewith into engagement with said inwardly offset side wall portion on one side of such side leg portion, said means mounting said second die means on said support means including means enabling relative movement therebetween, means rotating said second die means upon such relative movement, and means resiliently holding said second die means and said support means against such relative movement, continued movement of said support means following engagement of said second die means with said inwardly offset side wall portion causing rotation of said second die means to partially bend such side leg portion, third die means mounted for movement toward said second die means on the opposite side of such side leg portion, fourth die means movable toward said first die means to engage such partially bent side leg portion and further bend the same around said second die means, fifth die means positioned in the path of movement of said fourth die means, and means moving said third die means against said second die means upon continued movement of said fourth die means to bend such side leg portion against said fifth die means.

References Cited in the file of this patent

UNITED STATES PATENTS

| | | |
|---|---|---|
| 788,817 | Beyer | May 2, 1905 |
| 1,001,198 | Kempster | Aug. 22, 1911 |
| 1,001,531 | Haas | Aug. 22, 1911 |
| 1,333,049 | Werner et al. | Mar. 9, 1920 |
| 1,343,267 | Kenny | June 15, 1920 |
| 1,351,009 | Smith | Aug. 24, 1920 |
| 1,641,631 | Hoffman | Sept. 6, 1927 |
| 2,138,495 | Lewis | Nov. 29, 1938 |
| 2,217,333 | Dahlman | Oct. 8, 1940 |
| 2,361,983 | Veley | Nov. 7, 1944 |
| 2,497,297 | Court | Feb. 14, 1950 |

FOREIGN PATENTS

| | | |
|---|---|---|
| 323,499 | France | Aug. 5, 1902 |